United States Patent Office 3,286,700
Patented Nov. 22, 1966

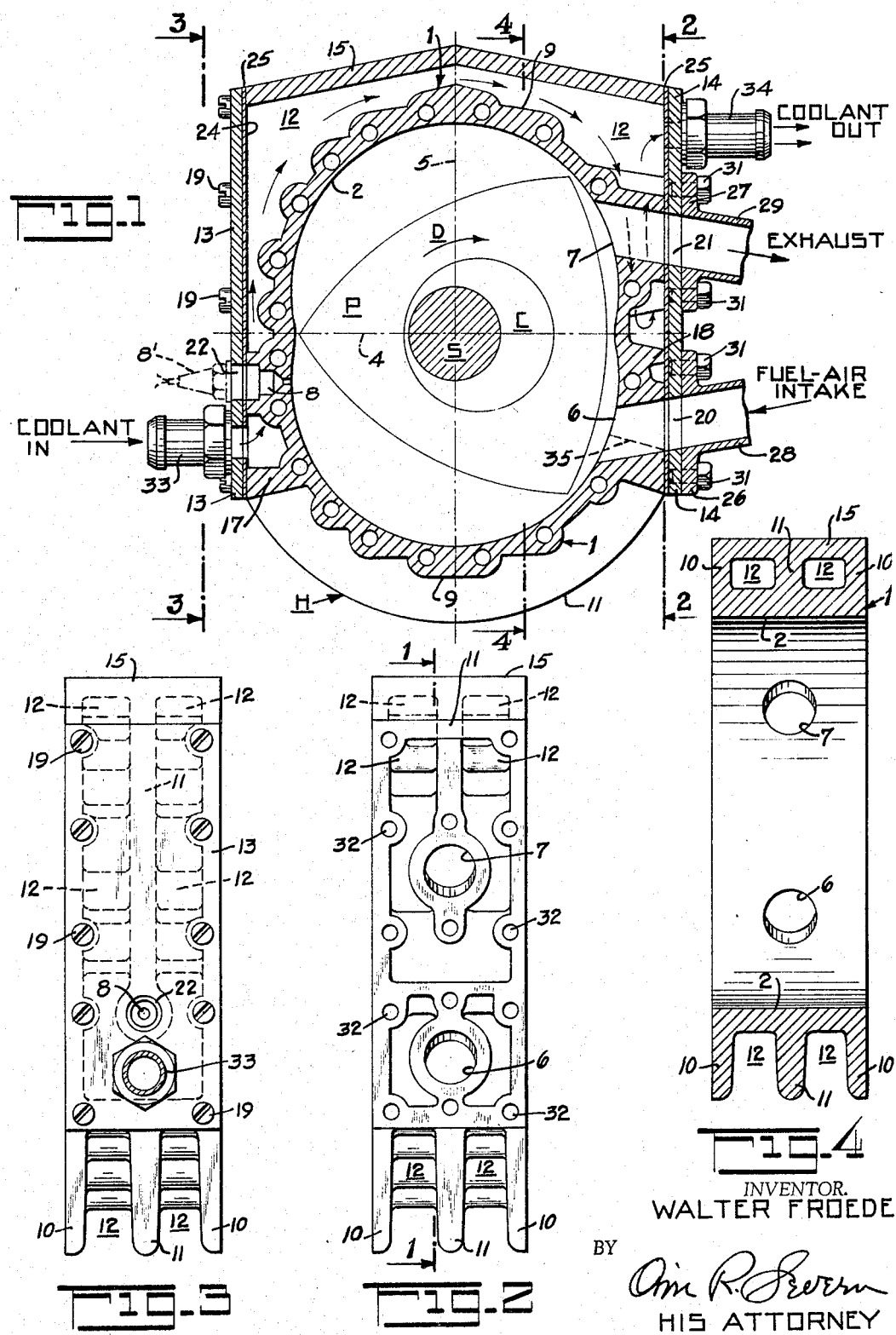

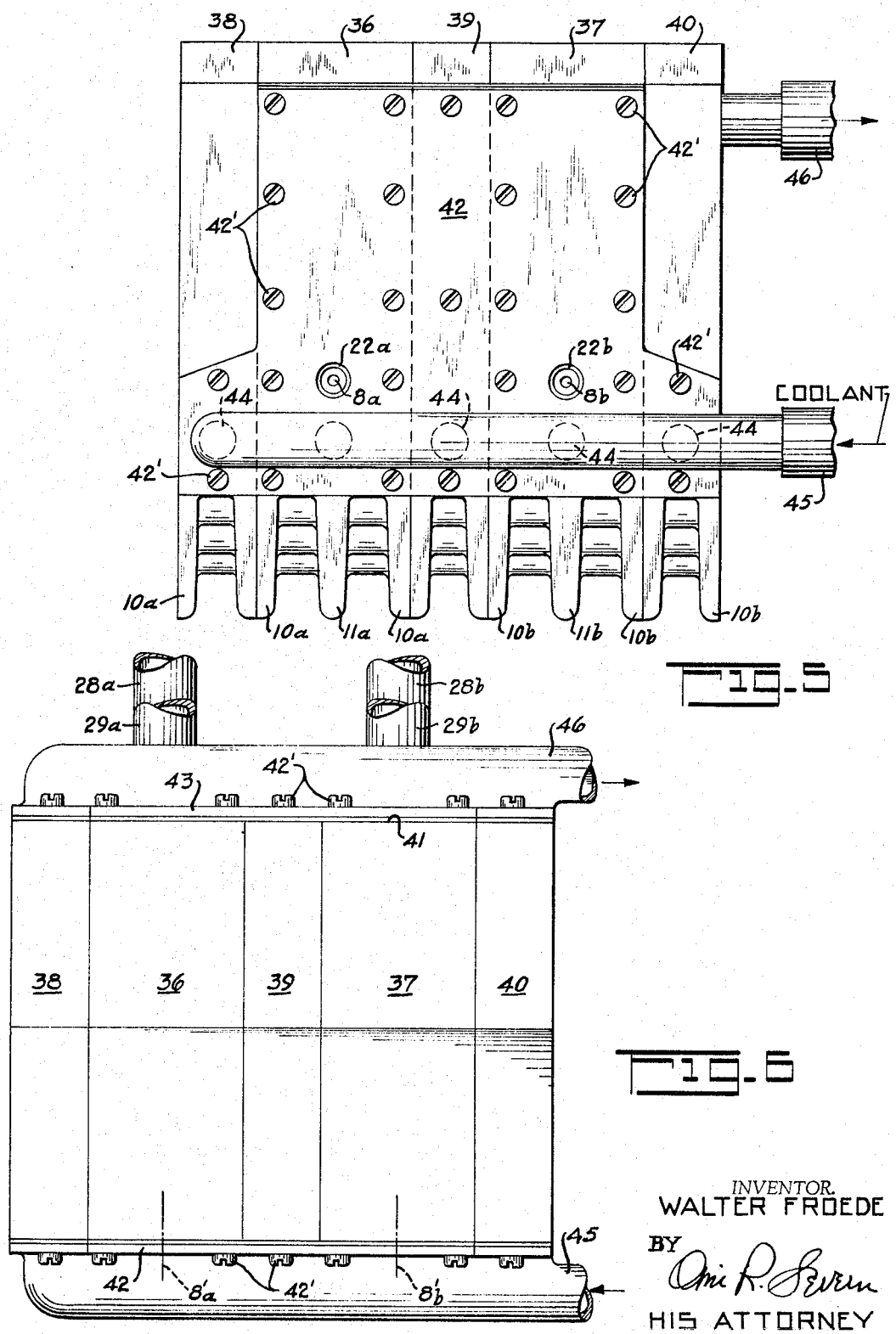

3,286,700
FLUID COOLED HOUSING FOR INTERNAL COMBUSTION ENGINES
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany, both corporations
Filed July 28, 1964, Ser. No. 385,730
Claims priority, application Germany, Aug. 22, 1963, N 23,639
10 Claims. (Cl. 123—8)

This invention relates to fluid cooled housings for internal combustion engines, and particularly to rotary combustion engines.

In the rotary combustion engine, herein referred to as "RC engine," a rotary piston is so mounted for eccentric movement within an enclosing housing that during each revolution it successively defines working chambers for the complete operating cycle, including fuel-air mixture intake, compression, combustion and exhaust. Accordingly, the enclosing housing is subject to uneven heat distribution, involving a "hot" section or region at the adjoining areas where maximum compression, combustion and exhaust of the hot gases occur. This hot section of the housing requires efficient application of a cooling medium, whereas the section receiving the comparatively cool mixture during intake and initial compression requires little if any, special cooling. An RC engine of this type is disclosed by way of example in U.S. Patent No. 3,081,753, granted March 19, 1963.

The enclosing housing in this form of RC engine comprises a peripheral shell, the inner wall of which defines the path of outermost travel of the rotor, and a pair of parallel side wall members that are attached to opposite sides of the shell to complete the rotor enclosure.

Several ways of cooling the hot section of the housing have been proposed including peripheral and also transverse conduction of a coolant through correspondingly formed passages in the shell. The conveyance of the cooling fluid in a peripheral direction around the shell has proved to be particularly advantageous; however, the disposal of enclosed channels running in a peripheral direction through the shell has created manufacturing and mechanical difficulties. It has been suggested that the channels be covered by a metal band welded to the shell, or that the channels be closed by a separate shell. Both of these solutions are expensive, and in each case sealing the openings or "cut-outs" for the engine intake and exhaust channels as well as for the spark plug, creates difficulties. That is, since cut-outs are necessarily formed in the welded band, or in the separate cooling shell as the case may be, proper sealing requires either welding of the aforesaid band along the edges of the cut-outs or alternatively a complicated seal that is not necessarily reliable in operation.

The principal object of this invention therefore is to provide an easily manufactured and assembled shell enclosure for defining peripheral cooling channels, that lends itself to simple, inexpensive and reliable sealing in the regions at the induction (intake) and exhaust channels and at the spark plug, and also to constructional simplification of a multi-unit engine where a number of similar RC engine units are stacked in combination along a common operating shaft.

In accordance with a preferred embodiment of this invention, the RC engine housing is provided with parallel cooling passages or channels that extend peripherally over the "hot region" of the engine shell wall, said passages being advantageously defined by combining with the shell a preformed section integral therewith, and fabricated sections that are separately attached to the shell at opposite sides of the aforesaid preformed section. More specifically, the preformed section is at one end of the major axis of the characteristic two-lobe cavity of the shell. The opposite sides of the shell at opposite ends of the minor axis along the ignition area (or spark plug), and the intake and exhaust openings respectively, are each covered by a preformed plate or cover so as to enclose corresponding peripheral side channels for the coolant. The preformed shell-passage portion that is disposed peripherally between the aforesaid cover plates may conveniently be integrally cast with the shell itself. This portion includes the shell wall defining part of the "hot region," and a spaced outer or housing wall. Parallel ribs cast integrally with the inner and outer walls extend in circumferential direction along the shell wall. These ribs together with the spaced shell and outer walls, define coolant passages for that portion of the "hot region." The peripheral side channels formed by the side cover plates and shell ribs communicate with the corresponding passages described above for conducting coolant peripherally along the entire "hot region" of the engine.

The invention will be more fully set forth in the following description referring to the accompanying drawings and the features of novelty will be pointed out with particularity in the claims annexed to and forming a part of this specification.

Referring to the drawings:

FIG. 1 is a section taken along the line A—A of FIG. 2, through the shell housing of an RC engine embodying the present invention, with the engine side wall covers removed;

FIG. 2 is a side view of the shell with the cover removed, looking in the direction of the arrow E of FIG. 1;

FIG. 3 is a side view of the shell looking in the direction of the arrow F of FIG. 1;

FIG. 4 is a partial section through the shell taken along the line B—B of FIG. 1, omitting the rotor assembly;

FIG. 5 is a side view of a multiple arrangement of RC engines, looking in the direction of the arrow F of FIG. 1; and FIG. 6 is a plan view of the multiple engine arrangement, looking in the direction of the arrow G of FIG. 1.

Referring to FIG. 1, the housing H of an RC engine includes the engine shell 1 that defines the periphery of the two-lobe cavity mentioned above. The shell side walls are omitted for simplicity of disclosure as the cooling thereof is apart from the present invention. An engine of this type with cooled side walls is shown for example, in U.S. Patent No. 3,102,516, granted September 3, 1963.

The shell 1 has an inner surface 2 in the form of a two-lobed epitrochoid for example, whose minor axis 4 extends through opposite points where the curves of the epitrochoid join, and whose major axis 5 is transversely of the minor axis 4. A triangular piston generally indicated at P rotates in the housing in sealing relation with the inner surface 2 so as to define the working chambers of the engine. The piston movement is controlled in known manner by an eccentric cam C on the engine shaft S so that during a single revolution of the piston in the direction of arrow D, the working chambers receive through the intake channel 6 in the shell a fuel-air mixture, which after going through a four-stroke cycle is expelled as hot gases through the exhaust channel 7. The ignition may be produced in suitable manner, as by a spark plug, herein indicated simply by its center-line 8'. A spark plug recess 8 extends through the shell 1.

In accordance with the design of this engine, the individual operations of the four-stroke cycle each occur at the same place respectively inside the shell 1 and as mentioned above, this results in uneven distribution of heat along the periphery of the shell between so-called "hot" and "cold" regions along the shell periphery. Special cooling of the "hot region" only, is disclosed herein.

The shell wall 1 at its outer surface 9, has cast integral therewith parallel extending ribs 10 and 11 extending substantially around its periphery which as shown in FIGS. 2 and 4 form multiple parallel channels 12. These channels are enclosed throughout the "hot region" of the shell 1 in which ignition, combustion and expansion of hot gases occurs, and are open in the "cold region," as indicated in FIG. 4. The enclosed hot-region channels extend in their entirety in the direction of piston rotation from the ignition and combustion areas to beyond the exhaust opening 7, and include at one end of the major axis an unperforated intermediate section of the shell wall to which the enclosed channel structure is integrally united, as indicated at the upper part of FIG. 4.

At the opposite sides of the central section mentioned above and parallel to the major axis 5, the channels are enclosed by means of covers 13 and 14 that are secured to the shell wall as indicated. These side passages are continuous with the passages 12 in the central cast section defined by the integrally cast ribs 10, 11 and opposite walls 9 and 15 so as to form completely enclosed channels extending peripherally throughout the "hot region." For convenience in casting, the wall 15 to which the ribs 10 and 11 are cast may be non-linear and extend in straight lines from the major axis 5 as indicated in FIG. 1, to abut the wall 15 at its opposite ends, the adjoining end covers 13 and 14. The wall 15 may also extend parallel to the minor axis 4 if so desired for practical reasons of construction.

The channels 12 extending over the "hot region" along the sides of the shell are separated by terminal transverse walls 17 and 18 from the remaining open channels 12 in the "cold region" of the shell 1 where induction and compression of the fuel-air mixture occur. It is generally possible to dispense with special cooling in the "cold region," and the ribs 10 and 11 here serve primarily to stiffen the shell 1.

The outer end surfaces of the shell walls defining the induction or intake channel 6, the exhaust channel 7, spark plug recess 8 and ribs, terminate in respective planes parallel to the major axis 5. As described above, these end surfaces are capped by the cover plates 13 and 14 that may be conveniently secured to the shell walls 17 and 18 by screw attachments 19. Thus, the cooling channels 12 are both enclosed and isolated from the intake channel 6, exhaust channel 7 and spark plug recess 8 which are in registry with corresponding openings 20, 21 and 22 formed in the covers 13 and 14.

The end surfaces of the shell walls terminating respectively in planes as mentioned above, are precisely machined for planar accuracy as indicated at 24, so that conventional flat gaskets 25 can be clamped between the cover plates 13 and 14 and the respective plane surfaces for adequate sealing in a simple and inexpensive manner. In the region of the "cut-outs" 20 and 21, the cover plates 13 and 14 are in addition subject to the clamping pressure of the attachment flanges 26 and 27 of the intake and exhaust connections 28 and 29 respectively. The flanges may be secured in place by screws 31 that are threaded at 32 into the middle rib 11.

In addition to the intake and exhaust openings, there are provided connections 33 and 34 for the inflow and outflow of the cooling fluid through the covers 13 and 14 respectively. The cooling fluid enters the enclosed shell passages 12 through the connection 33 that is secured as indicated to the cover 13, and that is located upstream with respect to the spark plug recess 8. The coolant flows through the two parallel passages 12 separated by the middle rib 11 peripherally along the shell as described above, and continues across the top of the cast section as viewed in FIG. 1 so as to flow out through the outlet connection 34. As shown, the outlet connection 34 is closely adjacent to the gas exhaust opening 23 in advance thereof, referring to rotor direction. As indicated in FIGS. 1 and 2, a portion of the cooling fluid branches off prior to outlet of the main flow, and flows along a loop path 50 over the exhaust channel 7. For this purpose the middle rib is interrupted in the region between the exhaust opening 7 and the transverse wall 18. This branch or extension of the cooling channels serves to remove heat localized at the exhaust opening itself.

A practical advantage of the invention is that the shell as shown in FIG. 1 makes possible production thereof by pressure-casting. The outer surfaces 9 of the shell wall at 1, and also the walls extending beyond them, such as those of the intake opening 6 and the exhaust opening 7 may be shaped so that there is no undercutting relative to the direction in which the mold halves are withdrawn, depending of course on the direction in which the mold halves are withdrawn. This may be either parallel to the minor axis 4 or inclined about 20° to it. In the manufacture where the mold halves are withdrawn in a direction slanting relative to the minor axis 4 as indicated in FIG. 1, the flow of the coolant in the corners between the covers 13 and 14 and the wall 15 is improved. Also, this mold technique results in an improved approximately tangential flow of exhaust gases at the exhaust channel 7. Essentially the same approximately tangential flow for the incoming fuel-air mixture at the intake channel 6 is obtained simply by machining-off the corner indicated at 35 so that the intake opening at the shell has full perimeter. The corner 35 is required only for purposes of proper mold draft, as will be apparent from the description above.

Summarizing, it will be seen that the present invention wherein the engine housing has enclosed peripheral cooling passage formed along the "hot region" of the shell by an improved combination of cast and fabricated parts, lends itself to simple and precise construction, efficient and inexpensive sealing of the coolant in its passage around the "hot region" of the engine having the induction, exhaust and sparks plug openings, and provides for effective heat removal from the "hot region" of the engine.

FIGS. 5 and 6 show a multiple arrangement of RC engines wherein two shells 36 and 37 of the type described above, together with their associated side parts 38, 39 and 40, are disposed in conforming, parallel arrangement for operation as a common unit on a common engine shaft (not shown). The side parts 38, 39 and 40 are formed so that they, together with the open sides of the shells 36 and 37 form common seats 41 for the end covers 42 and 43. These end covers correspond to the cover plates 13 and 14, FIGS. 1 and 3. With this arrangement it is possible to cover the sides parallel to the major axis 5, FIG. 1, each with a common cover 42 and 43, respectively. There are disposed in the cover 42 connections 44 for the inflow of cooling fluid, which is brought in separately to each shell 36 and 37 and each side part 38, 39 and 40. The connections 44, FIG. 5, are conveniently connected in manifold manner to a single supply pipe 45. The coolant flows out similarly through a collector pipe 46 whose connections to the individual parts 36, 37, 38, 39 and 40 of the housing are apparent from the foregoing description and therefore need not be shown in detail.

It will be apparent that the present invention is not only an improvement in single-unit RC engines as described above, but also lends itself to simplification of the cooling passage system of multiple-unit RC engines that are compactly stacked side by side as illustrated, for operation in common.

It should be understood that this invention is not limited to specific details of construction and arrangement thereof herein illustrated, and that changes and modifications may occur to one skilled in the art without depending from the spirit of the invention.

I claim:
1. A fluid cooled housing for an engine of the rotary combustion type that includes a main peripheral shell within which a rotary piston is operable for completing in one revolution a four-stroke cycle process, said shell defining a two-lobe cavity having a major axis and a minor axis, said cavity at one side of the major axis having a fuel-air intake opening and a gas exhaust opening, the ignition taking place in the cavity at the opposite side of the major axis, whereby a "hot region" extends in the direction of piston rotation peripherally along the shell generally between the areas of ignition and exhaust, and a comparatively "cold region" extends between the areas of intake and ignition, the aforesaid housing throughout the peripheral extent of the "hot region" having parallel cooling passages extending peripherally over the shell, said passages being defined respectively by said shell, spaced flange-like ribs extending radially from the shell and positioned in respective planes parallel to the plane of said major and minor axes, and cover structure for enclosing the space between said ribs, said cover structure in part being integral with said ribs and shell throughout a central portion of the "hot region" at one end of the major axis, the cover structure at the adjoining sides of said central portion also comprising a first plate at one end of the minor axis having an opening for inflow of coolant to said passages, and a second plate at the opposite end of said minor axis having respective openings in registry with said intake and exhaust openings and also having an opening for outflow of said coolant, said first and second plates being secured to the respective sides of the shell and abutting said ribs for defining cooling passages in communicating alignment respectively, with the passages in said central portion, and for sealing the edges of said openings.

2. A fluid cooled engine housing as specified in claim 1 wherein the shell, channel ribs and cover structure defining the enclosed channel passages of the central portion at one end of the major axis, is an integral casting.

3. A fluid cooled housing as specified in claim 2 wherein the casting at opposite sides of the shell substantially parallel to the major axis has a finished plane surface conforming to the respective cover plates for sealing the cooling passages and shell openings.

4. A fluid cooled housing as specified in claim 1 wherein the shell and second cover plate at the exhaust opening side, define a branch passage for the coolant forming a loop to encompass the gas exhaust channel.

5. A fluid cooled housing as specified in claim 1 wherein the shell and first cover plate at the coolant inflow side have openings in registry for a spark plug, and the cover plate coolant opening is upstream with respect to the spark plug opening at one end of the "hot region."

6. A fluid cooled housing as specified in claim 1 wherein the shell has an integral transverse wall portion at each side thereof opposite the major axis for closing opposite ends of the cooling passages that extend throughout the "hot region" of the shell.

7. A fluid cooled housing as specified in claim 6 wherein one of the peripheral ribs on the shell at the exhaust opening side is discontinuous to form with the corresponding transverse wall and second cover plate, a branch loop coolant passage encompassing the exhaust channel.

8. A fluid cooled housing as specified in claim 1 for a multi-unit engine having a plurality of shells arranged along a common shaft axis with interposed side parts, wherein each end of the combined shells and side parts opposite a major axis is planar, and a common cover plate is secured to each planar side to form with each shell the corresponding cooling passages.

9. A fluid cooled housing as specified in claim 8 wherein each common cover plate has aligned openings for the corresponding inflow and outflow coolant passages, said passages communicating respectively with a common coolant supply and outflow connection that extends along a corresponding side of the multi-unit engine.

10. A fluid cooled housing as specified in claim 8 wherein the shells and side parts thereof have integral peripheral ribs extending along the "cold region" of the engine, and wherein the shell ribs are substantially continuous and are covered throughout the "hot region" to form coolant passages.

References Cited by the Examiner
UNITED STATES PATENTS
2,263,275  11/1941  Pieper.

MARK NEWMAN, *Primary Examiner.*

F. T. SADLER, *Asssistant Examiner.*